United States Patent
Xu et al.

(10) Patent No.: US 10,457,118 B2
(45) Date of Patent: Oct. 29, 2019

(54) VEHICLE AND VEHICLE COOLING SYSTEM

(71) Applicant: FORD GLOBAL TECHNOLOGIES, LLC, Dearborn, MI (US)

(72) Inventors: Jianqing Xu, Canton, MI (US); Jasbir Jaglan, Ann Arbor, MI (US); Mark G. Smith, Canton, MI (US); Yinhua Zheng, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 180 days.

(21) Appl. No.: 15/782,510

(22) Filed: Oct. 12, 2017

(65) Prior Publication Data

US 2019/0111760 A1  Apr. 18, 2019

(51) Int. Cl.
*B60H 1/00* (2006.01)
*F25B 5/02* (2006.01)
*B60H 1/32* (2006.01)

(52) U.S. Cl.
CPC ..... *B60H 1/00899* (2013.01); *B60H 1/00278* (2013.01); *B60H 1/00735* (2013.01); *B60H 1/32281* (2019.05); *F25B 5/02* (2013.01); *B60H 2001/00307* (2013.01); *B60H 2001/00928* (2013.01); *B60H 2001/00942* (2013.01); *F25B 2600/0261* (2013.01); *F25B 2600/2507* (2013.01); *F25B 2700/1931* (2013.01)

(58) Field of Classification Search
CPC ............... F25B 5/02; F25B 2600/0261; F25B 2600/2507; F25B 2700/1931; F25B 2400/0409; F25B 41/043; B60H 1/00899; B60H 1/32284; B60H 1/3225; B60H 1/32281
See application file for complete search history.

(56) References Cited

U.S. PATENT DOCUMENTS

| | | | |
|---|---|---|---|
| 6,517,323 B2 | 2/2003 | Kimura et al. | |
| 7,353,660 B2* | 4/2008 | Lifson | B60H 1/00885 62/199 |
| 7,430,874 B2* | 10/2008 | Prince | B60H 1/00207 62/199 |
| 9,249,801 B2 | 2/2016 | Fukasaku et al. | |
| 9,976,785 B2* | 5/2018 | Goel | F25B 41/003 |
| 10,107,536 B2* | 10/2018 | Senf, Jr. | F25B 49/02 |
| 2003/0041607 A1* | 3/2003 | Baumert | B60H 1/3205 62/199 |
| 2004/0148956 A1* | 8/2004 | Arshansky | F25B 9/008 62/335 |

(Continued)

FOREIGN PATENT DOCUMENTS

JP  01019269 A  *  1/1989  ......... B60H 1/00585

*Primary Examiner* — Devon Russell
(74) *Attorney, Agent, or Firm* — David Kelley; Brooks Kushman P.C.

(57) ABSTRACT

A vehicle includes a first cooling loop, a second cooling loop, and a controller. The first cooling loop includes a compressor and a chiller. The second cooling loop includes a valve and an evaporator. The second cooling loop extends from an input side to an output side of the chiller on the first loop. The controller is programmed to, responsive to operation of the chiller but not the evaporator, close and intermittently pulse open the valve each time a discharge pressure of the compressor exceeds a first threshold.

19 Claims, 2 Drawing Sheets

(56) References Cited

U.S. PATENT DOCUMENTS

| | | | |
|---|---|---|---|
| 2005/0056035 A1* | 3/2005 | Smith | B60H 1/00207 62/244 |
| 2005/0132728 A1* | 6/2005 | Lifson | F25B 45/00 62/149 |
| 2009/0249802 A1* | 10/2009 | Nemesh | B60H 1/00278 62/56 |
| 2011/0041523 A1* | 2/2011 | Taras | F25B 9/008 62/77 |
| 2011/0182753 A1* | 7/2011 | Taguchi | F04B 27/1804 417/222.1 |
| 2012/0125032 A1* | 5/2012 | Graaf | B60H 1/00278 62/318 |
| 2014/0096550 A1* | 4/2014 | Gao | B60L 58/27 62/115 |
| 2015/0013367 A1* | 1/2015 | Carpenter | B60H 1/00278 62/222 |
| 2015/0260439 A1 | 9/2015 | Ohta | |
| 2015/0276271 A1* | 10/2015 | Uselton | F25B 1/06 62/115 |

* cited by examiner

VEHICLE AND VEHICLE COOLING SYSTEM

TECHNICAL FIELD

This disclosure relates to vehicles and cooling system for vehicles.

BACKGROUND

Vehicles may include cooling or air conditioning systems configured to cool spaces within the vehicle or specific components of the vehicle.

SUMMARY

A vehicle includes a first cooling loop, a second cooling loop, and a controller. The first cooling loop includes a compressor and a chiller. The second cooling loop includes a valve and an evaporator. The second cooling loop extends from an input side to an output side of the chiller on the first loop. The controller is programmed to, responsive to operation of the chiller but not the evaporator, close and intermittently pulse open the valve each time a discharge pressure of the compressor exceeds a first threshold.

A vehicle cooling system includes a first refrigerant loop, a second refrigerant loop, and a controller. The first refrigerant loop includes a first heat exchanger. The second refrigerant loop includes a valve and a second heat exchanger. The second refrigerant loop extends from a high pressure side to a low pressure side of the first loop on opposing sides of the first heat changer. The controller is programmed to, responsive to operation of the first but not the second heat exchanger, close and intermittently pulse open the valve.

A vehicle includes a first refrigerant loop, a second refrigerant loop, a valve, and a controller. The first refrigerant loop includes a chiller. The second refrigerant loop includes an evaporator. The second refrigerant loop extends from an input side to an output side of the chiller on the first loop. The valve is disposed within the second loop between the evaporator and input side of the chiller. The controller is programmed to, responsive to operation of the chiller but not the evaporator, close and intermittently pulse open the valve.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
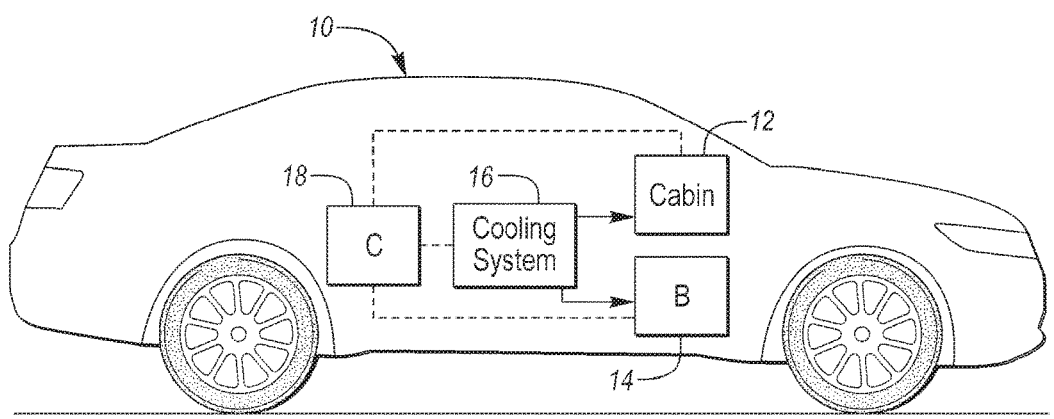
FIG. 1 is a schematic illustration of a vehicle.

Referring to FIG. 1, a vehicle 10 having a cabin 12, a battery 14, a cooling system 16, and a controller 18 is illustrated. The cooling system 16 is arranged to absorb heat from air being introduced into the cabin 12 and the battery 14. The cooling system 16 is also configured to transport the absorbed heat to a heat exchanger (i.e., condenser), which then rejects the heat to the ambient surroundings or ambient air. The controller 18 is utilized to coordinate the cooling of the cabin air with the cooling of the battery 14. The battery 14 may be a traction battery that is configured to power an electric motor to propel the vehicle 10. The vehicle 10 may be any type of vehicle including a non-hybrid vehicle (e.g., a vehicle that is propelled by an internal combustion engine), an electric vehicle (e.g., a battery operated electric vehicle), or a hybrid vehicle. Hybrid configurations may include, but are not limited to, micro-hybrid vehicles, series hybrid vehicles, parallel hybrid vehicles, series-parallel hybrid vehicles, plug-in hybrid electric vehicles (PHEVs), fuel cell hybrid vehicles, or any other vehicle configuration known to a person of ordinary skill in the art.

While illustrated as one controller, the controller 18 may be part of a larger control system and may be controlled by various other controllers throughout the vehicle 10, such as a vehicle system controller (VSC). It should therefore be understood that the controller 18 and one or more other controllers can collectively be referred to as a "controller" that controls various actuators in response to signals from various sensors to control functions the vehicle 10 or vehicle subsystems. The controller 18 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 18 in controlling the vehicle 10 or vehicle subsystems.

Control logic or functions performed by the controller 18 may include control strategies that are implemented using one or more processing strategies such as event-driven, interrupt-driven, multi-tasking, multi-threading, and the like. As such, various steps or functions of the control logic or functions may be performed in a specific sequence, in parallel, or in some cases omitted. One of ordinary skill in the art will recognize that one or more of the steps or functions may be repeatedly performed depending upon the particular processing strategy being used. Similarly, the order of processing is not necessarily required to achieve the features and advantages described herein. The control logic may be implemented primarily in software executed by a microprocessor-based vehicle or vehicle subsystem controller, such as controller 18. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The controller 18 may be configured to receive various states or conditions of the various components of the vehicle 10 via electrical signals. The electrical signals may be delivered to the controller 18 from the various components via input channels. Additionally, the electrical signals received from the various components may be indicative of a request or a command to change or alter a state of one or more of the respective components of the vehicle 10. The controller 18 includes output channels that are configured to deliver requests or commands (via electrical signals) to the various vehicle components. The controller 18 includes control logic and/or algorithms that are configured to generate the requests or commands delivered through the output channels based on the requests, commands, conditions, or states of the various vehicle components.

Figure 2:
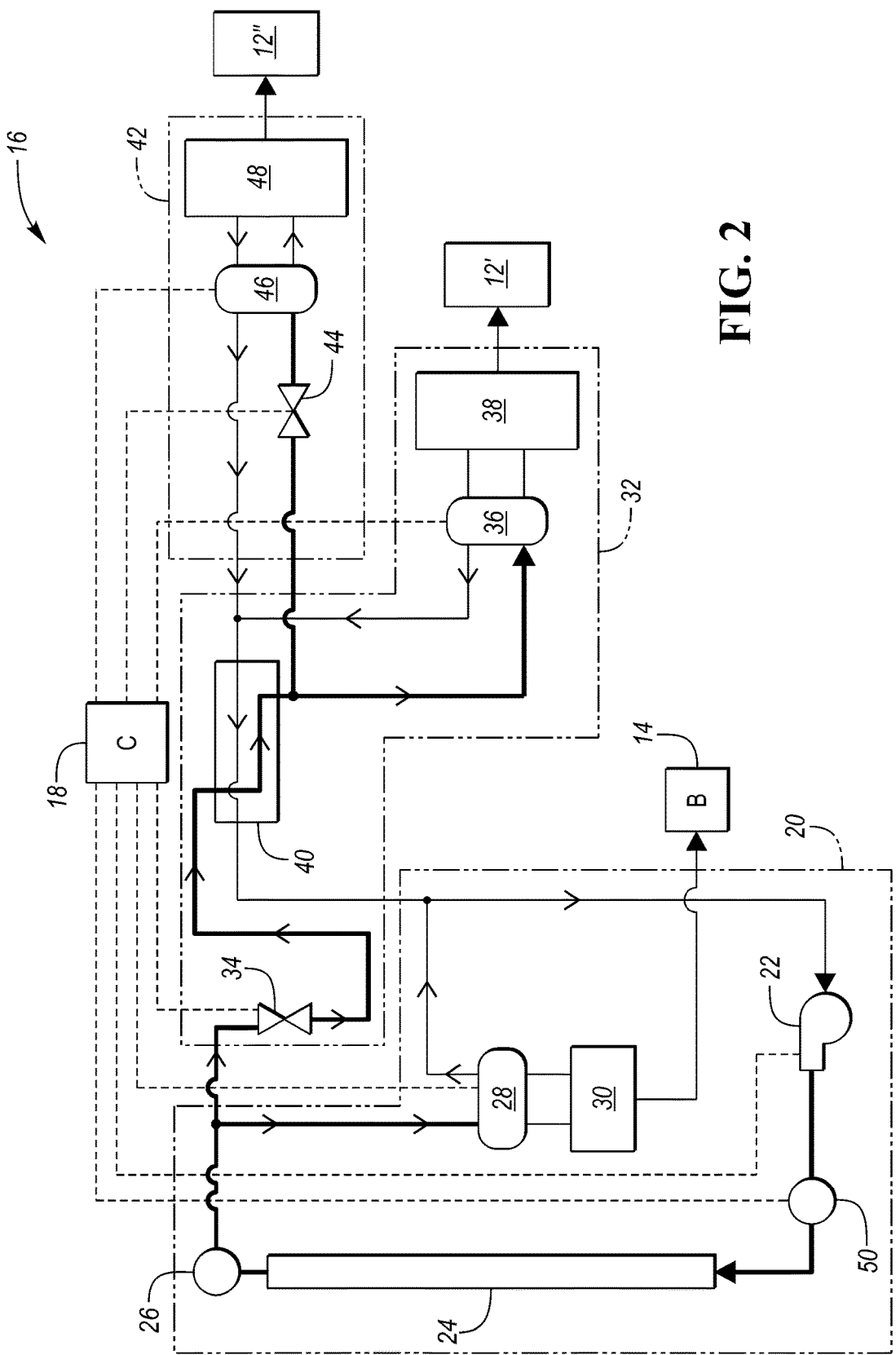
FIG. 2 is a schematic illustration of a vehicle cooling system.

Referring to FIG. 2, the vehicle cooling system 16 is illustrated. The cooling system 16 includes a first cooling (or refrigerant) loop 20. The first cooling loop 20 includes a compressor 22, a condenser 24, a receiver/dryer 26, a shutoff valve (not shown), a thermal expansion valve (or alternatively an electrical expansion valve) 28, and a chiller 30 (which may be referred to as the first heat exchanger). The shutoff valve may be located on the input side of the thermal expansion valve 28 between the receiver/dryer 26 and the thermal expansion valve 28. The shutoff valve may be configured to stop the flow of a coolant or refrigerant within the first cooling loop 20. More specifically, the shutoff valve in the first cooling loop 20 may be incorporated into and integral to the thermal expansion valve 28. The coolant or refrigerant in the first cooling loop 20 flows from the compressor 22 to the condenser 24, from the condenser 24 to the receiver/dryer 26, from the receiver/dryer 26 to the thermal expansion valve 28, from the thermal expansion valve 28 to the chiller 30, from the chiller 30 back to the thermal expansion valve 28, and from the thermal expansion valve 28 back to the compressor 22. The first cooling loop 20 includes a high pressure side that extends from the output of the compressor 22, through the condenser 24 and receiver/dryer 26, and to the input side of the thermal expansion valve 28. The first cooling loop 20 also includes a low pressure side that extends from the input side of thermal expansion valve 28, through the chiller 30 and output side the thermal expansion valve 28, and to the input side of the compressor 22.

The chiller 30 may be configured to absorb heat from the battery 14 and transfer the heat to the coolant or refrigerant within the first cooling loop 20. The chiller 30 may be a cold plate that contacts the battery 14 or may be a cold plate that absorbs heat from a secondary coolant loop that is configured to cool the battery 14. The secondary coolant loop may include a liquid, such as water or glycol, that absorbs heat from the battery 14. Alternatively, the chiller may be an evaporator that includes a coil. The battery 14 may be cooled by directing air across the coil of the evaporator (which will transfer heat from the air to the coolant or refrigerant in the first cooling loop 20) followed by directing the same air then across the battery 14. The air may be directed through the evaporator and across the battery by a fan or blower. Once the chiller 30 has transferred heat to the coolant or refrigerant, the coolant or refrigerant will then pass through the compressor 22 and onto the condenser 24 where the heat will then be rejected to the ambient surroundings. The condenser 24 may include a coil. The cooling system 16 may include a fan or blower that directs air across the coil of the condenser 24 in order to transfer the heat from the coolant or refrigerant to the ambient surroundings.

Alternatively, the chiller 30 may be configured to cool some other system within the vehicle 10, other than the battery 14. For example, the chiller 30 may be configured to cool a traction motor in an electric or hybrid vehicle, an inverter in an electric or hybrid vehicle, any of the power electronics in the vehicle, a transmission including the transmission electronics and/or the transmission fluid, a turbocharger, a supercharger, a fuel cell exhaust gas water condenser, diesel fuel in a diesel operated vehicle, or engine oil. This list is not meant to be exhaustive and it should be understood that the chiller 30 could be utilized to cool any auxiliary system within the vehicle 10 that may require additional cooling.

The cooling system 16 includes a second cooling (or refrigerant) loop 32. The second cooling loop 32 is connected to the first cooling loop 20 and extends from the input side (or high pressure side) of the thermal expansion valve 28 and chiller 30 to the output side (or low pressure side) of the thermal expansion valve 28 and chiller 30. The second cooling loop 32 includes a second shutoff valve 34, a second thermal expansion valve (or alternatively a second electrical expansion valve) 36, an evaporator 38 (which may be referred to as the second heat exchanger), and an internal heat exchanger 40. The second shutoff valve 34 may be located on the input side of the second thermal expansion valve 36 between the first cooling loop 20 and the second thermal expansion valve 36. The second shutoff valve 34 may be configured to stop the flow of coolant or refrigerant within the second cooling loop 32.

The coolant or refrigerant in the second cooling loop 32 flows from the input side of the thermal expansion valve 28 of the first cooling loop 20 (or the high pressure side of the first cooling loop 20) through the internal heat exchanger 40 to the second thermal expansion valve 36, from the second thermal expansion valve 36 to the evaporator 38, from the evaporator 38 back to the second thermal expansion valve 36, and from the second thermal expansion valve 36 through the internal heat exchanger 40 to the output side of the thermal expansion valve 28 of the first cooling loop 20 (or the low pressure side of the first cooling loop 20). The second cooling loop 32 includes a high pressure side that extends from the input side of the thermal expansion valve 28 of the first cooling loop 20 (or the high pressure side of the first cooling loop 20) to the input side of the second thermal expansion valve 36. The second cooling loop 32 also includes a low pressure side that extends from the input side of second thermal expansion valve 36, through the evaporator 38 and output side the second thermal expansion valve 36, and to the output side of the thermal expansion valve 28 of the first cooling loop 20 (or the low pressure side of the first cooling loop 20).

The evaporator 38 may be configured to cool the cabin 12. More specifically, the evaporator 38 may be configured to cool a first portion of the cabin 12' (e.g., a front portion of the cabin 12). The evaporator 38 may include a coil. The first portion of the cabin 12' may be cooled by directing air across the coil of the evaporator 38 (which will transfer heat from the air to the coolant or refrigerant in the second cooling loop 32) followed by directing the same air into the first portion of the cabin 12'. The air may be directed through the evaporator 38 and into the first portion of the cabin 12' by a fan or blower. Once the evaporator 38 has transferred heat to the coolant or refrigerant, the coolant or refrigerant will then return the to the first cooling loop 20, pass through the compressor 22 and onto the condenser 24 where the heat will then be rejected to the ambient surroundings.

The cooling system 16 may include a third cooling (or refrigerant) loop 42. The third cooling loop 42 is connected to the second cooling loop 32 and extends from the input side of the second thermal expansion valve 36 and evaporator 38 (or high pressure side of the second cooling loop 32) to the output side of the second thermal expansion valve 36 and evaporator 38 (or low pressure side of the second cooling loop 32). The third cooling loop 42 includes a third shutoff valve 44, a third thermal expansion valve (or alternatively a third electrical expansion valve) 46, and a second evaporator 48 (which may be referred to as the third heat exchanger). The third shutoff valve 44 may be located on the input side of the third thermal expansion valve 46 between the second cooling loop 32 and the third thermal expansion valve 46. The third shutoff valve 44 may be configured to stop the flow of coolant or refrigerant within the third cooling loop 42.

The coolant or refrigerant in the third cooling loop 42 flows from the input side of the second thermal expansion valve 36 of the second cooling loop 32 (or the high pressure side of the second cooling loop 32) to the third shutoff valve 44, from the third shutoff valve 44 to the third thermal expansion valve 46, from the third thermal expansion valve 46 to the second evaporator 48, from the second evaporator 48 back to the third thermal expansion valve 46, and from the third thermal expansion valve 46 to the internal heat exchanger 40 and output side of the second thermal expansion valve 36 of the second cooling loop 32 (or low pressure side of the second cooling loop 32). The third cooling loop 42 includes a high pressure side that extends from the input side of the second thermal expansion valve 36 of the second cooling loop 32 (or the high pressure side of the second cooling loop 32) to the input side of the third thermal expansion valve 46. The third cooling loop 42 also includes a low pressure side that extends from the input side of third thermal expansion valve 46, through the second evaporator 48 and output side the third thermal expansion valve 46, and to the output side of the second thermal expansion valve 36 of the second cooling loop 32 (or the low pressure side of the second cooling loop 32).

The second evaporator 48 may be configured to cool the cabin 12. More specifically, the second evaporator 48 may be configured to cool a second portion of the cabin 12" (e.g., a rear portion of the cabin 12). The second evaporator 48 may include a coil. The second portion of the cabin 12" may be cooled by directing air across coil of the second evaporator 48 (which will transfer heat from the air to the coolant or refrigerant in the third cooling loop 42) followed by directing the same air into the second portion of the cabin 12". The air may be directed through the second evaporator 48 and into the second portion of the cabin 12" by a fan or blower. Once the second evaporator 48 has transferred heat to the coolant or refrigerant, the coolant or refrigerant will then return to the first cooling loop 20 via the second cooling loop 32, pass through the compressor 22 and onto the condenser 24 where the heat will then be rejected to the ambient surroundings.

The controller 18 may be in communication with the compressor 22, the thermal expansion valve 28 (including the shutoff valve of the first cooling loop 20), the second shutoff valve 34, the second thermal expansion valve 36, the third shutoff valve 44, and the third thermal expansion valve 46. The controller 18 may also be in communication with various user controls and/or sensors (such as temperature sensors) that direct or command the cooling system 16 to cool the vehicle cabin 12 (or a portion thereof), the battery 14, or any other auxiliary system that is connected to the cooling system 16. The cooling system 16 may also include a pressure sensor 50 that measures a coolant or refrigerant pressure on the high pressure side of the first cooling loop 20. The pressure sensor 50 may be located at any position on the high pressure side of the first cooling loop 20. For example, the pressure sensor may be located at the discharge or output of the compressor 22 (as shown), on either side of the condenser 24, or on either side of the receiver/dryer 26. The pressure of the coolant or refrigerant at the output of the compressor is then communicated to the controller 18 by the pressure sensor 50.

During a mode where the chiller 30 is operating alone to cool the battery 14 (or other system that the chiller 30 may be configured to cool), the second shutoff valve 34 and the third shutoff valve 44 will be closed such that the evaporator 38 and second evaporator 48 will not be operating to cool the cabin 12 or any portion thereof. It should also be noted that the shutoff valve in the first cooling loop 20 (which may be integral to thermal expansion valve 28) will be open and the compressor 22 will be operating when the chiller 30 is operating alone. Under the scenario where the chiller 30 is operating alone, excess coolant or refrigerant may be drawn into the first cooling loop 20 from portions of the high and low pressure sides of the second cooling loop 32 and third cooling loop 42 that are downstream of the second shutoff valve 34 and the third shutoff valve 44. The excess coolant or refrigerant may cause the pressure at the discharge or output of the compressor 22 to exceed a discharge pressure limit (which may also be referred as a shutdown threshold). Under such a scenario, the compressor 22 can be automatically powered-off by the controller 18 to protect the inverter in electric compressor from drawing too much current and over-heating. This may be problematic if the compressor 22 shuts down while the battery 14 (or other system that the chiller 30 may be configured to cool) still requires cooling.

In order to prevent the compressor 22 from shutting down during a mode where the chiller 30 is operating alone, the controller 18 may be programmed to close the second shutoff valve 34 and intermittently pulse open the second shutoff valve 34. Intermittently pulsing open the second shutoff valve 34 will decrease the pressure of the coolant or refrigerant within the first cooling loop 20 (and more specifically the pressure of the coolant or refrigerant at the discharge or output of the compressor 22) by flowing the excess coolant or refrigerant out of the first cooling loop 20 and back into the second cooling loop 32 and/or third cooling loop 42. Intermittently pulsing open the second shutoff valve 34 may refer to occasionally opening the second shutoff valve 34 at regular or irregular time intervals for brief periods of time, following by re-closing second shutoff valve 34 as long as the cooling system 16 is being commanded to operate the chiller 30 alone.

The second shutoff valve 34 may be pulsed open at regular predetermined evenly spaced time intervals while the cooling system 16 is being commanded to operate the chiller 30 alone. Each time the second shutoff valve 34 is pulsed open, the second shutoff valve 34 may remain open for a predetermined period of time. The timing and/or duration of pulsing open the second shutoff valve 34 may correspond with predetermined times and/or durations that prevent the first cooling loop 20 from overfilling with coolant or refrigerant to the point where liquid coolant or refrigerant (as opposed to gaseous coolant or refrigerant) begins to enter the compressor 22 from the input side (or low-pressure side) of the first cooling loop 20.

Alternatively, the second shutoff valve 34 may be pulsed open each time the pressure of the refrigerant or the coolant at the discharge or output of the compressor 22 exceeds a first threshold. The first threshold may be less than the shutdown threshold of the compressor 22. The first threshold made be set and/or adjusted based on the ambient temperature of the vehicle's surroundings and the rotational speed of the compressor 22. Once the second shutoff valve 34 has been pulsed open in response to the output or discharge pressure of the compressor 22 exceeding the first threshold, the second shutoff valve 34 may remain open for a predetermined period of time or may remain open until the discharge pressure of the compressor 22 drops below a second threshold that is less than the first threshold. The second threshold may correspond to a pressure of the coolant or refrigerant at the discharge or output of the compressor 22 that is sufficiently low such that the compressor 22 is not likely to power down. It should be noted, that intermittently pulsing open a shutoff valve to alleviate pressure in a first cooling or refrigerant loop of a cooling system is applicable to any cooling system having two or more cooling loops. For example, if the third cooling loop 42 were eliminated in FIG. 2, pressure could be alleviated in the first cooling loop 20 by intermittently pulsing open the second shutoff valve 34 to allow coolant to flow from the first cooling loop 20 to the second cooling loop 32 only during a mode where the chiller 30 is operating alone (where the second shutoff valve 34 is closed such that the evaporator 38 is not operating).

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a first cooling loop including a compressor and a chiller;
   a second cooling loop including a valve and an evaporator, and extending from an input side to an output side of the chiller on the first loop; and
   a controller programmed to, responsive to operation of the chiller but not the evaporator, close and intermittently pulse open the valve each time a discharge pressure of the compressor exceeds a first threshold.

2. The vehicle of claim 1, wherein the valve is disposed within the second loop between the evaporator and input side of the first loop.

3. The vehicle of claim 1, wherein the controller is further programmed to, responsive to each pulsing open of the valve, close the valve when the discharge pressure of the compressor drops to below a second threshold that is less than the first threshold.

4. The vehicle of claim 1, wherein the compressor is configured to power-off responsive to the discharge pressure of the compressor exceeding a shutdown threshold that is greater than the first threshold.

5. The vehicle of claim 1 further comprising a traction battery, and wherein the chiller is configured to cool the traction battery.

6. The vehicle of claim 1 further comprising a cabin, and wherein the evaporator is configured to cool the cabin.

7. A vehicle cooling system comprising:
   a first refrigerant loop including a first heat exchanger;
   a second refrigerant loop including a valve and a second heat exchanger, and extending from high to low pressure sides of the first loop on opposing sides of the first heat exchanger; and
   a controller programmed to, responsive to operation of the first but not the second heat exchanger, close and intermittently pulse open the valve at regular time intervals.

8. The system of claim 7, wherein the valve remains open for a predetermined time period each time the valve is pulsed open.

9. The system of claim 7, wherein the valve is disposed within the second refrigerant loop between the second heat exchanger and the high pressure side of the first loop.

10. The system of claim 7, wherein the first refrigerant loop includes a compressor and the controller is further programmed to, responsive to operation of the first hut not the second heat exchanger, intermittently pulse open the valve each time a discharge pressure of the compressor exceeds a first threshold.

11. The system of claim 10, wherein the controller is further programmed to, responsive to each pulsing open of the valve, close the valve when the discharge pressure of the compressor drops to below a second threshold that is less than the first threshold.

12. The system of claim 7, wherein the first heat exchanger is configured to cool a vehicle traction battery.

13. The system of claim 7, wherein the second heat exchanger is configured to cool a vehicle cabin.

14. A vehicle comprising:
   a first refrigerant loop including a chiller;
   a second refrigerant loop including an evaporator and extending from an input side to an output side of the chiller on the first loop;
   a valve disposed within the second loop between the evaporator and input side; and
   a controller programmed to, responsive to operation of the chiller but not the evaporator, close and intermittently pulse open the valve.

15. The vehicle of claim 14, wherein the valve is intermittently pulsed open at regular time intervals.

16. The vehicle of claim 14, wherein the valve remains open for a predetermined time period each time the valve is pulsed open.

17. The vehicle of claim 14, wherein the first refrigerant loop includes a compressor and the controller is further programmed to, responsive to operation of the chiller but not the evaporator, intermittently pulse open each time a discharge pressure of the compressor exceeds a first threshold.

18. The vehicle of claim 17, wherein the controller is further programmed to, responsive to each pulsing open of the valve, close the valve when the discharge pressure of the compressor drops to below a second threshold that is less than the first threshold.

19. The vehicle of claim 17, wherein the compressor is configured to power-off responsive to the discharge pressure of the compressor exceeding a shutdown threshold that is greater than the first threshold.

\* \* \* \* \*